United States Patent
Hadisurya et al.

(10) Patent No.: US 12,504,092 B2
(45) Date of Patent: Dec. 23, 2025

(54) PROPELLANT VALVE

(71) Applicant: The Boeing Company, Arlington, VA (US)

(72) Inventors: Handoko Hadisurya, La Mirada, CA (US); John R. Hull, Seattle, WA (US); Robert J. Atmur, Whittier, CA (US)

(73) Assignee: The Boeing Company, Arlington, VA (US)

( * ) Notice: Subject to any disclaimer, the term of this patent is extended or adjusted under 35 U.S.C. 154(b) by 197 days.

(21) Appl. No.: 18/407,658

(22) Filed: Jan. 9, 2024

(65) Prior Publication Data
US 2025/0224045 A1    Jul. 10, 2025

(51) Int. Cl.
*F16K 31/06*    (2006.01)
*F16K 31/08*    (2006.01)

(52) U.S. Cl.
CPC ...... *F16K 31/0679* (2013.01); *F16K 31/0655* (2013.01); *F16K 31/08* (2013.01)

(58) Field of Classification Search
CPC ... F16K 31/0679; F16K 31/0655; F16K 31/08
See application file for complete search history.

(56) References Cited

U.S. PATENT DOCUMENTS

| | | | | |
|---|---|---|---|---|
| 3,814,376 A | * | 6/1974 | Reinicke | F16K 31/082 251/129.1 |
| 3,889,219 A | * | 6/1975 | Larner | F16K 35/16 335/253 |
| 3,977,436 A | * | 8/1976 | Larner | F16K 35/16 137/625.65 |
| 4,392,632 A | * | 7/1983 | Gast | F16K 31/082 251/360 |
| 4,690,371 A | * | 9/1987 | Bosley | H01F 7/18 251/129.08 |

(Continued)

FOREIGN PATENT DOCUMENTS

CN    108533820 A    9/2018
EP    0916881 A1 *    5/1999    ............. F16K 31/06

OTHER PUBLICATIONS

EP 0916881A1, Leuschner et al. Machine translation (Year: 1999).*

(Continued)

*Primary Examiner* — Daphne M Barry
(74) *Attorney, Agent, or Firm* — Hanley, Flight & Zimmerman, LLC

(57) ABSTRACT

A propellant valve includes a ferromagnetic shell and a pair of coils within an opening of the ferromagnetic shell. The propellant valve includes a bobbin extending from an upper section of the ferromagnetic shell to a lower section of the ferromagnetic shell. The bobbin seals the opening of the ferromagnetic shell. The propellant valve includes an upper ferromagnetic pole coupled to an upper portion of the bobbin. The propellant valve includes a lower ferromagnetic pole coupled to a lower portion of the bobbin. The propellant valve includes a ferromagnetic filter retainer coupled to the upper ferromagnetic pole. The propellant valve includes a magnet configured to move between a top portion of the lower ferromagnetic pole and a bottom portion of the ferromagnetic filter retainer based on a magnetic field generated by the pair of coils.

20 Claims, 8 Drawing Sheets

(56) References Cited

U.S. PATENT DOCUMENTS

| | | | | |
|---|---|---|---|---|
| 4,779,582 A | * | 10/1988 | Lequesne | H01F 7/1646 |
| | | | | 123/90.11 |
| 4,794,947 A | * | 1/1989 | Kuramochi | G01F 1/6847 |
| | | | | 137/486 |
| 5,150,879 A | | 9/1992 | Mullally | |
| 5,905,423 A | * | 5/1999 | Hoppe | F16K 31/0658 |
| | | | | 335/229 |
| 6,269,784 B1 | * | 8/2001 | Newton | F01L 9/20 |
| | | | | 123/90.11 |
| 7,066,915 B2 | * | 6/2006 | Olsen | A61M 5/14276 |
| | | | | 604/288.04 |
| 11,111,934 B2 | * | 9/2021 | Bujewicz | F16K 31/0682 |
| 12,104,583 B2 | * | 10/2024 | Perna | B64G 1/413 |

OTHER PUBLICATIONS

European Patent Office, "Extended European Search Report," issued in connection with European Patent Application No. 24215449.0, dated May 20, 2025, 6 pages.

* cited by examiner

PROPELLANT VALVE

FIELD

The present disclosure generally relates to a valve, and more particularly, to a satellite latching propellant valve.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Gas propellant valves are used by satellites to perform positioning maneuvers while the satellites are in orbit. For example, a gas propellant valve is a mechanism of propulsion that enables a satellite to move once the satellite is in position above Earth. Typically, there is a finite amount of gas propellant available to maneuver the satellite. Thus, to improve efficiency, accurate timing of a gas release, by the gas propellant valve, is important.

Manufacturing gas propellant valves for satellites that can accurately release gas typically requires the use of specialized unique parts, which can be cost intensive. Additionally, the weight of a typical gas propellant valve for a satellite is relatively large. As a non-limiting example, a typical gas propellant valve for a satellite can weigh at least 0.75 pound-mass (lbm). Furthermore, the manufacturing process time for a typical gas propellant valve is approximately twelve months, which is quite long.

SUMMARY

The present application is directed to propellant valve for a satellite. In particular, according to the techniques described herein, a permanent magnet is used to open and close the propellant valve. The propellant valve includes a ferromagnetic outer shell. A pair of coils are located within an opening of the ferromagnetic outer shell. Based on an amplitude and polarity of a current applied to the pair of coils, a force associated with a resulting magnetic field moves the permanent magnet in an upwards direction or a downwards direction. When the permanent magnet is moved in the upwards direction, the propellant valve opens and enables fluid (e.g., xenon gas) from a fluid reservoir to flow through the propellant valve and be released by a nozzle. By releasing the fluid from the nozzle, the satellite can perform positioning maneuvers. When the permanent magnet is moved in the downwards direction, the propellant valve closes and inhibits the flow of the fluid from the fluid reservoir.

In one aspect, the present application discloses a propellant valve. The propellant valve includes a ferromagnetic shell. The ferromagnetic shell includes a side section, an upper section that is perpendicular and continuous to the side section, and a lower section that is perpendicular and continuous to the side section. The side section, the upper section, and lower section define an opening of the ferromagnetic shell. The propellant valve also includes a pair of coils within the opening of the ferromagnetic shell. The propellant valve also includes a bobbin extending from the upper section of the ferromagnetic shell to the lower section of the ferromagnetic shell. The bobbin seals the opening of the ferromagnetic shell. The propellant valve also includes an upper ferromagnetic pole coupled to an upper portion of the bobbin and to the upper section of the ferromagnetic shell. The propellant valve also includes a lower ferromagnetic pole coupled to a lower portion of the bobbin and to the lower section of the ferromagnetic shell. The propellant valve also includes a ferromagnetic filter retainer coupled to the upper ferromagnetic pole. The propellant valve also includes a magnet configured to move between a top portion of the lower ferromagnetic pole and a bottom portion of the ferromagnetic filter retainer based on a magnetic field generated by the pair of coils.

In another aspect, the present application discloses a space vehicle. The space vehicle includes a fluid reservoir and a propellant valve configured to control a release of fluid from the fluid reservoir. The propellant valve includes a ferromagnetic shell. The ferromagnetic shell includes a side section, an upper section that is perpendicular and continuous to the side section, and a lower section that is perpendicular and continuous to the side section. The side section, the upper section, and lower section define an opening of the ferromagnetic shell. The propellant valve also includes a pair of coils within the opening of the ferromagnetic shell. The propellant valve also includes a bobbin extending from the upper section of the ferromagnetic shell to the lower section of the ferromagnetic shell. The bobbin seals the opening of the ferromagnetic shell. The propellant valve also includes an upper ferromagnetic pole coupled to an upper portion of the bobbin and to the upper section of the ferromagnetic shell. The propellant valve also includes a lower ferromagnetic pole coupled to a lower portion of the bobbin and to the lower section of the ferromagnetic shell. The propellant valve also includes a ferromagnetic filter retainer coupled to the upper ferromagnetic pole. The propellant valve also includes a magnet configured to move between a top portion of the lower ferromagnetic pole and a bottom portion of the ferromagnetic filter retainer based on a magnetic field generated by the pair of coils.

In another aspect, the present application discloses a method. The method includes applying a first current to a pair of coils within an opening of a ferromagnetic shell to open a propellant valve. The propellant valve includes the ferromagnetic shell. The ferromagnetic shell includes a side section, an upper section that is perpendicular and continuous to the side section, and a lower section that is perpendicular and continuous to the side section. The side section, the upper section, and lower section define an opening of the ferromagnetic shell. The propellant valve also includes a bobbin extending from the upper section of the ferromagnetic shell to the lower section of the ferromagnetic shell. The bobbin seals the opening of the ferromagnetic shell. The propellant valve also includes an upper ferromagnetic pole coupled to an upper portion of the bobbin and to the upper section of the ferromagnetic shell. The propellant valve also includes a lower ferromagnetic pole coupled to a lower portion of the bobbin and to the lower section of the ferromagnetic shell. The propellant valve also includes a ferromagnetic filter retainer coupled to the upper ferromagnetic pole. The propellant valve also includes a magnet configured to move between a top portion of the lower ferromagnetic pole and a bottom portion of the ferromagnetic filter retainer based on a magnetic field generated by the pair of coils. The method also includes applying a second current to the pair of coils to close the propellant valve.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE DRAWINGS

A more complete understanding of examples of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
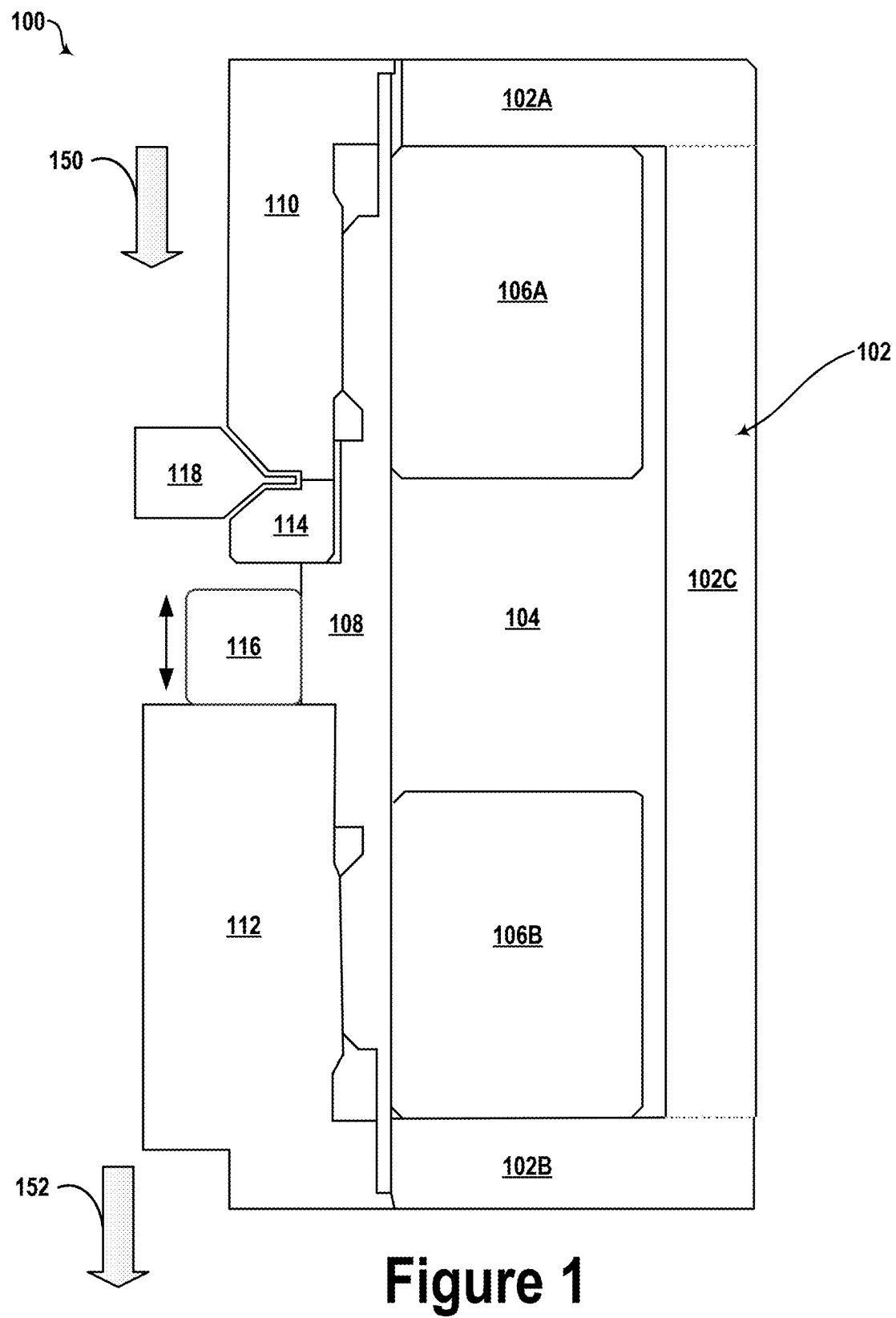
FIG. 1 illustrates a cross-sectional view of a propellant valve, according to an example.

The figures and the following description illustrate specific examples. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, coils are illustrated and associated with reference number 106. When referring to a particular one of the coils, such as the coil 106A, the distinguishing letter "A" is used. However, when referring to any arbitrary one of the coils or to the coils as a group, the reference number 106 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Furthermore, as used herein, certain positional terms are used to describe different features. As non-limiting examples, the positional terms "upper", "lower", "top", and "bottom" may be used to describe different features described herein. It should be understood that the positional terms used herein are used to describe a relative position of a feature component with respect to another feature of component, as illustrated in the drawings. Thus, the positional terms used herein are not construed to be limiting and are only used to describe relative positions of different features as illustrated in the drawings.

Figure 7:
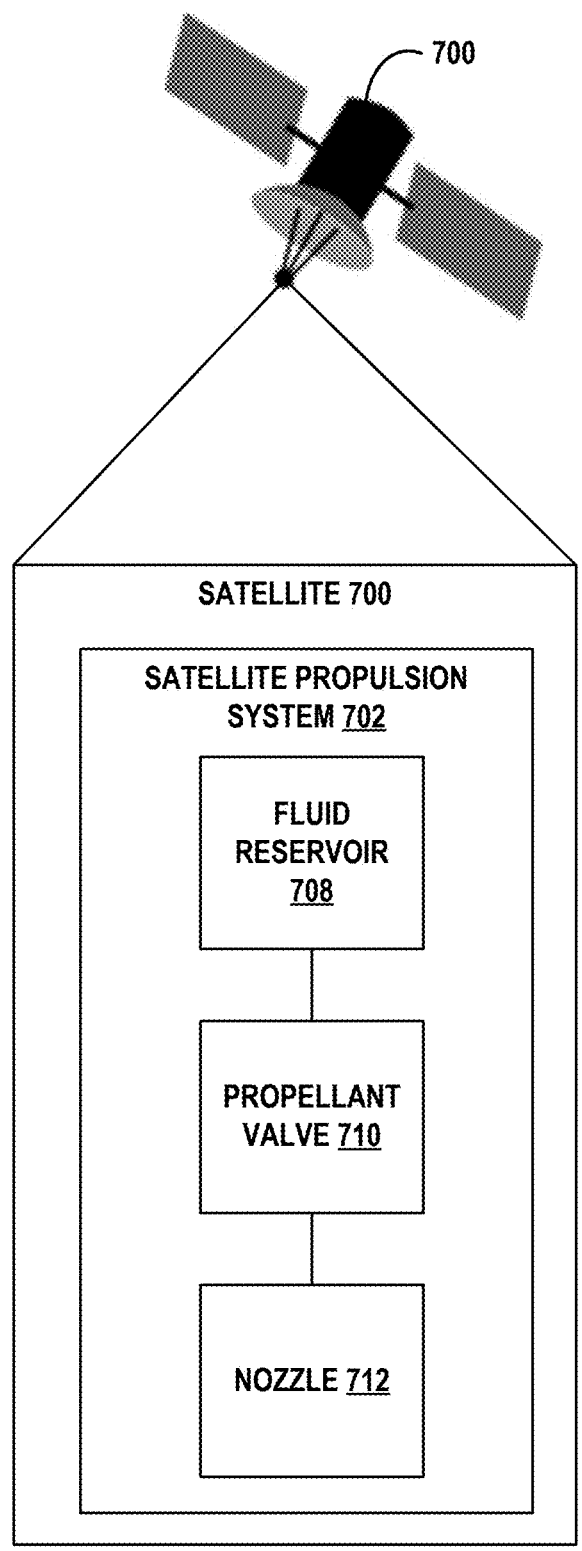
FIG. 7 illustrates a satellite that includes a propellant valve, according to an example.

Referring to FIG. 1, a cross-sectional view of a propellant valve 100 is illustrated, in accordance with an example. In some examples, as illustrated in FIG. 7, the propellant valve 100 can be integrated into a satellite, such as the satellite 700. In particular, the propellant valve 100 can be used to perform positioning maneuvers while the satellite is in orbit. For example, the propellant valve 100 can be used as a mechanism of propulsion that enables the satellite to move once the satellite is in position above Earth.

As illustrated in FIG. 1, the propellant valve 100 includes a ferromagnetic shell 102. The ferromagnetic shell 102 includes an upper section 102A, a lower section 102B, and a side section 102C. The upper section 102A of the ferromagnetic shell 102 can be perpendicular and continuous to the side section 102C of the ferromagnetic shell 102, and the lower section 102B of the ferromagnetic shell 102 can be perpendicular and continuous to the side section 102C of the ferromagnetic shell 102. The ferromagnetic shell 102 is an outer shell of the propellant valve 100.

As illustrated in FIG. 1, the upper section 102A, the lower section 102B, and the side section 102C define an opening 104 of the ferromagnetic shell 102. According to some examples, the ferromagnetic shell 102 can be comprised of stainless steel; however, in other examples, the ferromagnetic shell 102 can be comprised of any other ferromagnetic material.

The propellant valve 100 also includes a pair of coils 106 that is disposed within the opening 104 of the ferromagnetic shell 102. For example, the pair of coils 106 includes an upper coil 106A coupled to the upper section 102A of the ferromagnetic shell 102 and a lower coil 106B coupled to the lower section 102B of the ferromagnetic shell 102. According to some examples, the coils 106A, 106B can be comprised of copper wire. According to some examples, the coils 106A, 106B can be comprised of aluminum wire. In yet other examples, the coils 106A, 106B can be comprised of other electrically conducting material.

The propellant valve 100 also includes a bobbin 108 that extends from the upper section 102A of the ferromagnetic shell 102 to the lower section 102B of the ferromagnetic shell 102. According to some examples, the bobbin 108 is comprised of a non-magnetic material. As a non-limiting example, the bobbin 108 can be comprised of stainless steel. In particular, if the bobbin 108 is comprised of stainless steel, to ensure that the bobbin 108 is non-magnetic, the alloy has an austenitic crystal structure. As illustrated in FIG. 1, the bobbin 108 seals the opening 104 of the ferromagnetic shell 102. For example, the bobbin 108 is located across from the side section 102C of the ferromagnetic shell 102 such as to seal the opening 104 of the ferromagnetic shell 102.

The propellant valve 100 also includes an upper ferromagnetic pole 110. The upper ferromagnetic pole 110 is coupled to an upper portion of the bobbin 108. For example, as illustrated in FIG. 1, the upper ferromagnetic pole 110 is coupled to, and runs along, the upper portion of the bobbin 108. In some examples, the upper ferromagnetic pole 110 is also coupled to the upper section 102A of the ferromagnetic shell 102. In other examples, the upper ferromagnetic pole 110 is electrically and/or physically isolated from the upper section 102A of the ferromagnetic shell 102. For example, there may be a small gap between the upper ferromagnetic pole 110 and the upper section 102A of the ferromagnetic shell 102. As illustrated in FIG. 1, the upper ferromagnetic pole 110 at least partially defines a fluid entrance region 150 from which fluid (e.g., xenon gas) enters the propellant valve 100 from a fluid reservoir, such as the fluid reservoir 708 of FIG. 7. According to some examples, the upper ferromagnetic pole 110 can be comprised of stainless steel; however, in other examples, the upper ferromagnetic pole 110 can be comprised of any other ferromagnetic material.

The propellant valve 100 also includes a lower ferromagnetic pole 112. The lower ferromagnetic pole 112 is coupled to a lower portion of the bobbin 108. For example, as illustrated in FIG. 1, the lower ferromagnetic pole 112 is coupled to, and runs along, the lower portion of the bobbin 108. In some examples, the lower ferromagnetic pole 112 is also coupled to the lower section 102B of the ferromagnetic shell 102. In other examples, the lower ferromagnetic pole 112 is electrically and/or physically isolated from the lower section 102B of the ferromagnetic shell 102. For example, there may be a small gap between the lower ferromagnetic pole 112 and the lower section 102B of the ferromagnetic shell 102. As illustrated in FIG. 1, the lower ferromagnetic pole 112 at least partially defines a fluid exit region 152 from which fluid exits the propellant valve 100 when the propellant valve 100 is open. According to some examples, the lower ferromagnetic pole 112 can be comprised of stainless steel; however, in other examples, the lower ferromagnetic pole 112 can be comprised of any other ferromagnetic material.

The propellant valve 100 also includes a ferromagnetic filter retainer 114. The ferromagnetic filter retainer 114 is coupled to the upper ferromagnetic pole 110. In some examples, the ferromagnetic filter retainer 114 is also coupled to the bobbin 108. According to some examples, the ferromagnetic filter retainer 114 can be comprised of stainless steel; however, in other examples, the ferromagnetic filter retainer 114 can be comprised of any other ferromagnetic material.

A fluid filter 118 is coupled to the upper ferromagnetic pole 110 and to the ferromagnetic filter retainer 114. For example, the ferromagnetic filter retainer 114, along with the upper ferromagnetic pole 110, create a space to insert and hold (e.g., retain) the fluid filter 118. The fluid filter 118 can be configured to filter fluid (e.g., xenon gas) from the fluid entrance region 150 of the propellant valve 100.

The propellant valve 100 also includes a magnet 116 (e.g., a "permanent" magnet). The magnet 116 can be configured to move between a top portion of the lower ferromagnetic pole 112 and a bottom portion of the ferromagnetic filter retainer 114 based on a magnetic field generated by the pair of coils 106A, 106B. For example, when a first current is applied to the pair of coils 106A, 106B within the opening 104 of the ferromagnetic shell 102, a resulting magnetic field applies an upward force to the magnet 116 and moves the magnet 116 to the bottom portion of the ferromagnetic filter retainer 114, as described in greater detail with respect to FIG. 3. When a second current is applied to the pair of coils 106A, 106B within the opening 104 of the ferromagnetic shell 102, a resulting magnetic field applies a downward force to the magnet 116 and moves the magnet 116 to the top portion of the lower ferromagnetic pole 112, as described in greater detail with respect to FIG. 4.

The propellant valve 100 is open when the magnet 116 is latched against the bottom portion of the ferromagnetic filter retainer 114. When the propellant valve 100 is open, fluid (e.g., xenon gas) flows from the fluid reservoir, through the fluid entrance region 150 of the propellant valve 100, and out through the fluid exit region 152 of the propellant valve 100 to a nozzle. Thus, when the propellant valve 100 is open, the flow of the fluid can be used as a mechanism of propulsion that enables a satellite to move once the satellite is in position above Earth. The propellant valve 100 is closed when the magnet 116 is latched against the top portion of the lower ferromagnetic pole 112. When the propellant valve 100 is closed, fluid does not flow out through the fluid exit region 152. As described with respect to FIG. 2, a portion of the magnet 116 covers the fluid exit region 152 to inhibit the flow of fluid through the fluid exit region 152.

It should be appreciated that the propellant valve 100 of FIG. 1 can be constructed using a permanent magnet 116 and relatively easily machined parts. The propellant valve 100 is a direct acting valve that uses the single magnet 116 as the moving element in the valve 100. As a result, there are no complex mechanics to move (e.g., open and close) the propellant valve 100. Additionally, a fabrication cost is less than a conventional satellite propellant valve that uses a magnet having an array of wedged-shaped pieces that are magnetized in corresponding radial directions. Also, the manufacturing time for constructing the propellant valve 100 is significantly less than the manufacturing time of a conventional satellite propellant valve.

In some examples, the propellant valve 100 can have its state changed (e.g., between opened and closed) by a short electrical pulse through one or the other of two bifilar coil pairs. The upper and lower coils 106A, 106B can be wired in anti-series. In order to switch directions of current, a bipolar power supply can be used or a mono-polar power supply and two switches can be used. An alternate example includes using a bifilar coil pair, such as a first coil pair in anti-series and a second coil pair that is turn-for-turn adjacent to the first coil pair, but wired in the opposite direction. In this example, a mono-polar power supply can be used with a single switch that connect the positive voltage to either a lead from one coil pair or to the lead from the other coil pair.

Figure 2:
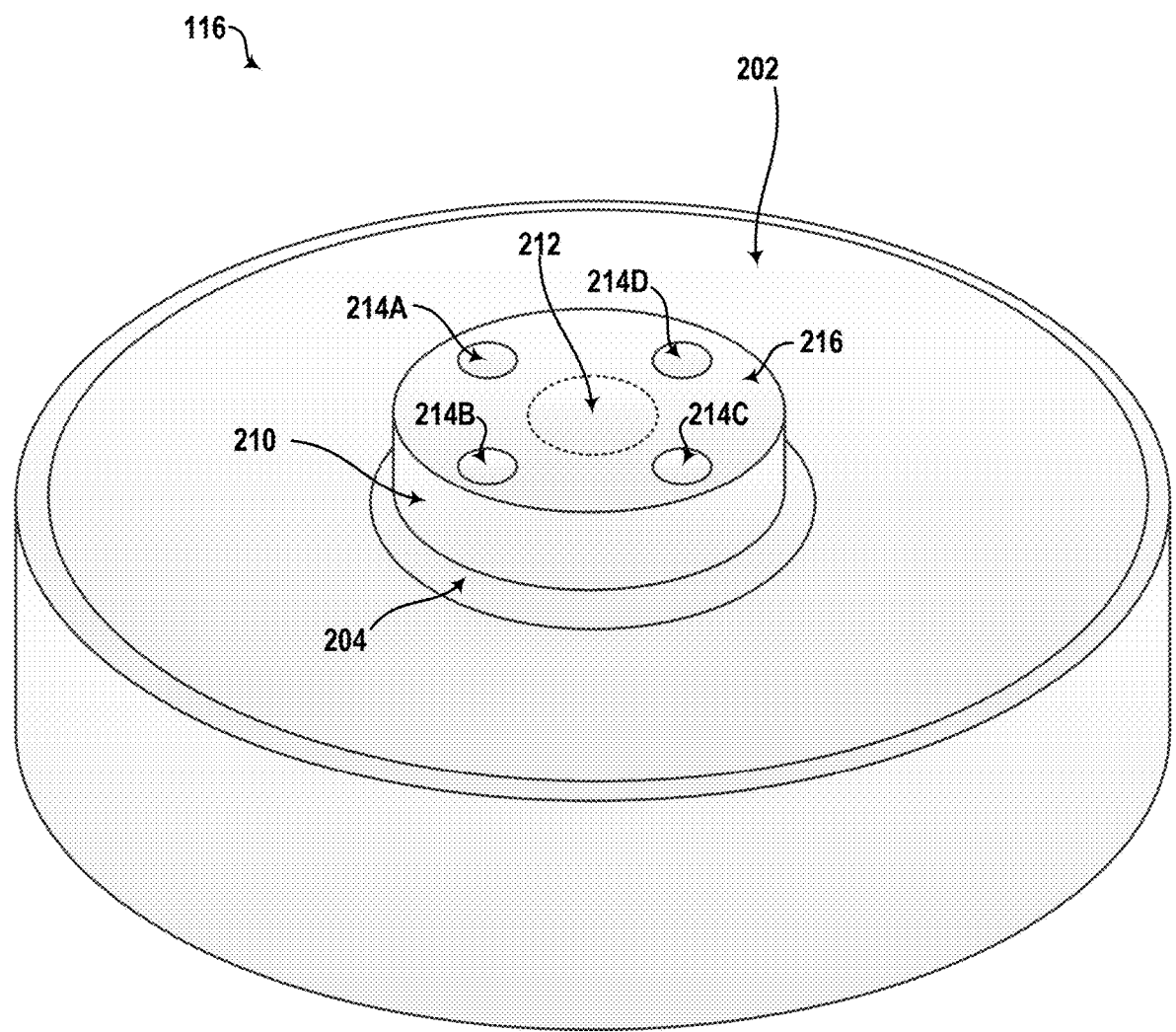
FIG. 2 illustrates a magnet of the propellant valve, according to an example.

Referring to FIG. 2, the magnet 116 of the propellant valve 100 is illustrated, in accordance with an exemplary example. In particular, a bottom view of the magnet 116 is illustrated in FIG. 2. For example, a bottom surface 202 of the magnet 116, as illustrated in FIG. 2, can be coupled to the top portion of the lower ferromagnetic pole 112, as illustrated in FIG. 1. As illustrated in FIG. 2, the magnet 116 can be an annular cylindrical disk. In some examples, the magnet 116 can be comprised of Iron-Boron-Neodymium (FeBNd). In other examples, the magnet 116 can be comprised of a different permanent magnet material, such as Iron, Nickel, Cobalt, and some rare earth metals.

As illustrated in FIG. 2, a hole 204 is centrally located on the bottom surface 202 of the magnet 116. A cylindrical insert 210 is inserted within the hole 204. In some examples, as illustrate in FIG. 2, a bottom surface 216 of the cylindrical insert 210 extends below the bottom surface 202 of the magnet 116. However, in other examples, the bottom surface 216 of the cylindrical insert 210 is coincident with the bottom surface 202 of the magnet 116.

The bottom surface 216 of the cylindrical insert 210 includes a central region 212 (e.g., a solid central region). The central region 212 of the cylindrical insert 210 can be configured to cover (e.g., completely cover) the fluid exit region 152 of the propellant valve 100 when the propellant valve 100 is closed. Thus, the central region 212 of the cylindrical insert 210 can be used to inhibit fluid from flowing out the fluid exit region 152 when the propellant valve 100 is closed.

The cylindrical insert 210 can also include one or more insert holes 214 around the central region 212 of the cylindrical insert 210. For example, the cylindrical insert 210 includes an insert hole 214A, an insert hole 214B, an insert hole 214C, and an insert hole 214D. Although four (4) insert holes 214 are depicted in FIG. 2, in other examples, additional (or fewer) insert holes can be included in the cylindrical insert 210. As a non-limiting example, in some examples, the cylindrical insert 210 can include eight (8) insert holes around the central region 212. As another non-limiting example, in some examples, the cylindrical insert 210 can include three (3) insert holes around the central region 212. The insert holes 214 can cut through the thickness of the cylindrical insert 210.

Figure 3:
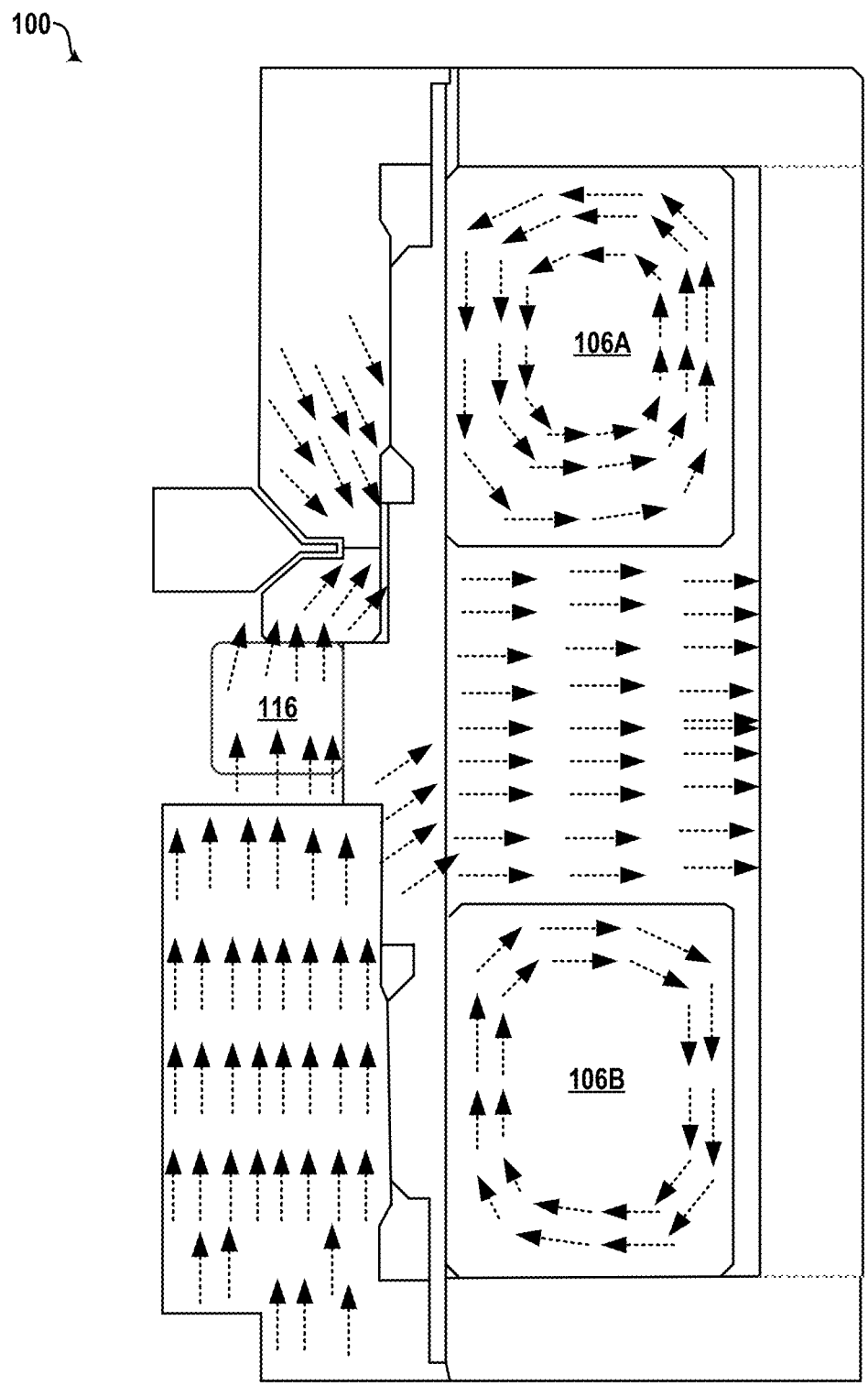
FIG. 3 illustrates a magnetic field flow in the vicinity of the magnet when coil currents move the magnet from a closed position to an open position; according to an example.

Referring to FIG. 3, a magnetic field flow in the vicinity of the magnet 116 when the coil currents move the magnet 116 from a closed position to an open position is illustrated, in accordance with an exemplary example. The magnetic field flow is illustrated by the dotted arrows.

To move the magnet 116 from the closed position to the open position, as illustrated in FIG. 3, the coils 106A, 106B are energized. The net force (e.g., any force due to fluid pressure in addition to a magnetic force) is upward when moving the magnet 116 from the closed position to the open position. The coils 106A, 106B are energized by applying a first current to the coils 106A, 106B. The current applied to each coil 106A, 106B flows in an opposite direction. As a non-limiting example, a current of negative twenty-one-hundred (−2100) ampere turns (AT) may be applied to the coil 106A, and a current of twenty-one-hundred (2100) AT may be applied to the coil 106B. It should be understood that the numbers of ampere turns described herein are for illustrative purposes only and should not be construed as limiting. In other implementations, a different number of ampere turns can be applied to move the magnet 116. The range of the number of ampere turns applied to the coils 106A, 106B may vary based on the size of the magnet 116, the length of the coils 106A, 106B, etc. A positive ampere turn number is from current flowing into the page in the cross-sectional view of FIG. 3, and a negative ampere turn number is from current flowing out of the page in the cross-sectional view of FIG. 3. In some implementations, it is possible to energize just one of the coils 106 to effect motion of the magnet 116; however, the coils 106 would have to be considerably larger than when they are wired together in the anti-series configuration.

Figure 4:
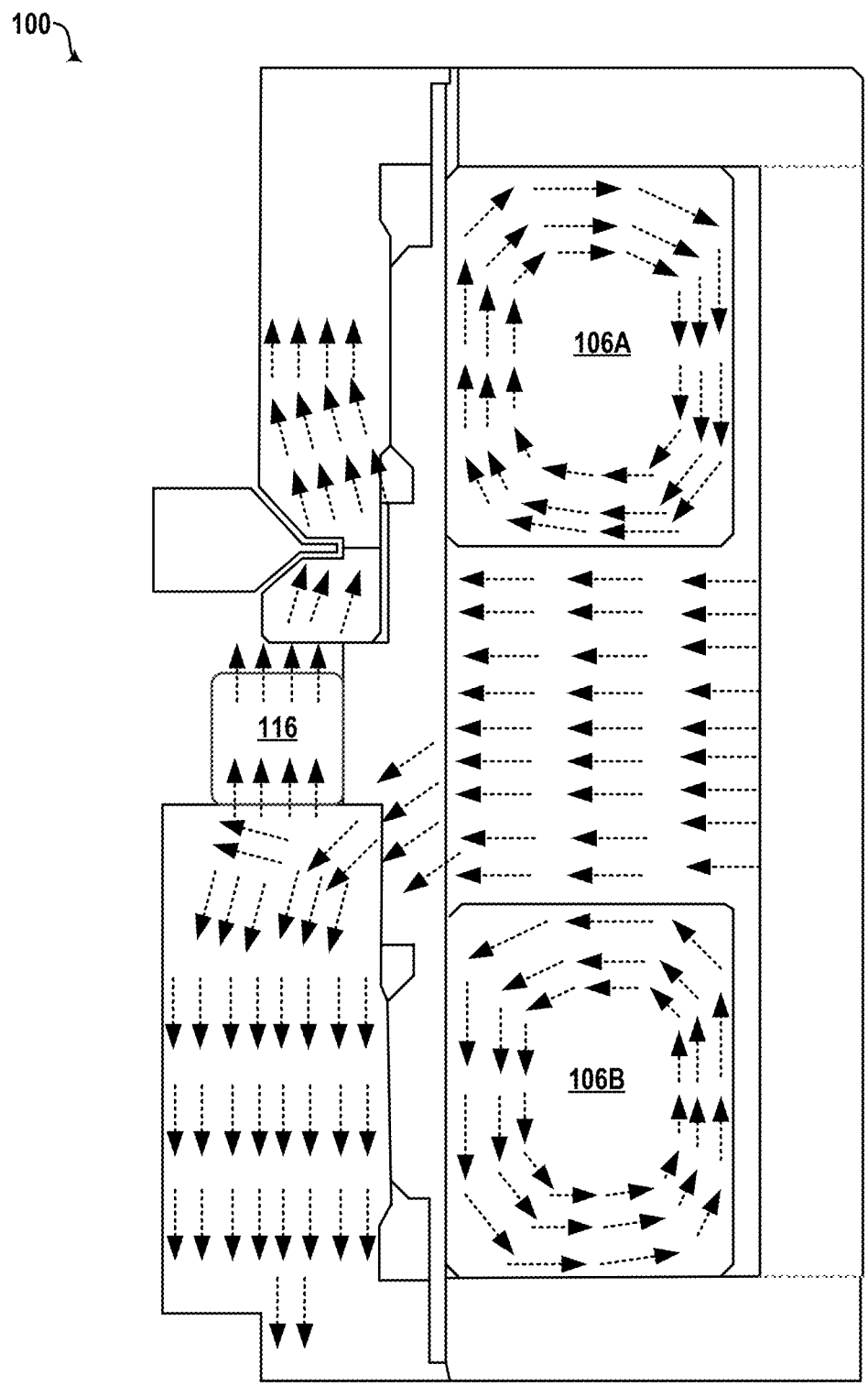
FIG. 4 illustrates a magnetic field flow in the vicinity of the magnet when the coil currents move the magnet from an open position to a closed position, according to an example.

Referring to FIG. 4, a magnetic field flow in the vicinity of the magnet 116 when the coil currents move the magnet 116 from an open position to a closed position is illustrated, in accordance with an exemplary example. The magnetic field flow is illustrated by the dotted arrows.

To move the magnet 116 from the open position to the closed position, as illustrated in FIG. 4, the coils 106A, 106B are energized. The net force (e.g., any force due to fluid pressure in addition to a magnetic force) is downward when moving the magnet 116 from the open position to the closed position. The coils 106A, 106B are energized by applying a second current to the coils 106A, 106B. The current applied to each coil 106A, 106B flows in an opposite direction. As a non-limiting example, a current of twenty-one-hundred (2100) AT may be applied to the coil 106A, and a current of negative twenty-one-hundred (2100) AT may be applied to the coil 106B. A positive ampere turn number is from current flowing into the page in the cross-sectional view of FIG. 4, and a negative ampere turn number is from current flowing out of the page in the cross-sectional view of FIG. 4. In some implementations, it is possible to energize just one of the coils 106 to effect motion of the magnet 116; however, the coils 106 would have to be considerably larger than when they are wired together in the anti-series configuration.

Figure 5:
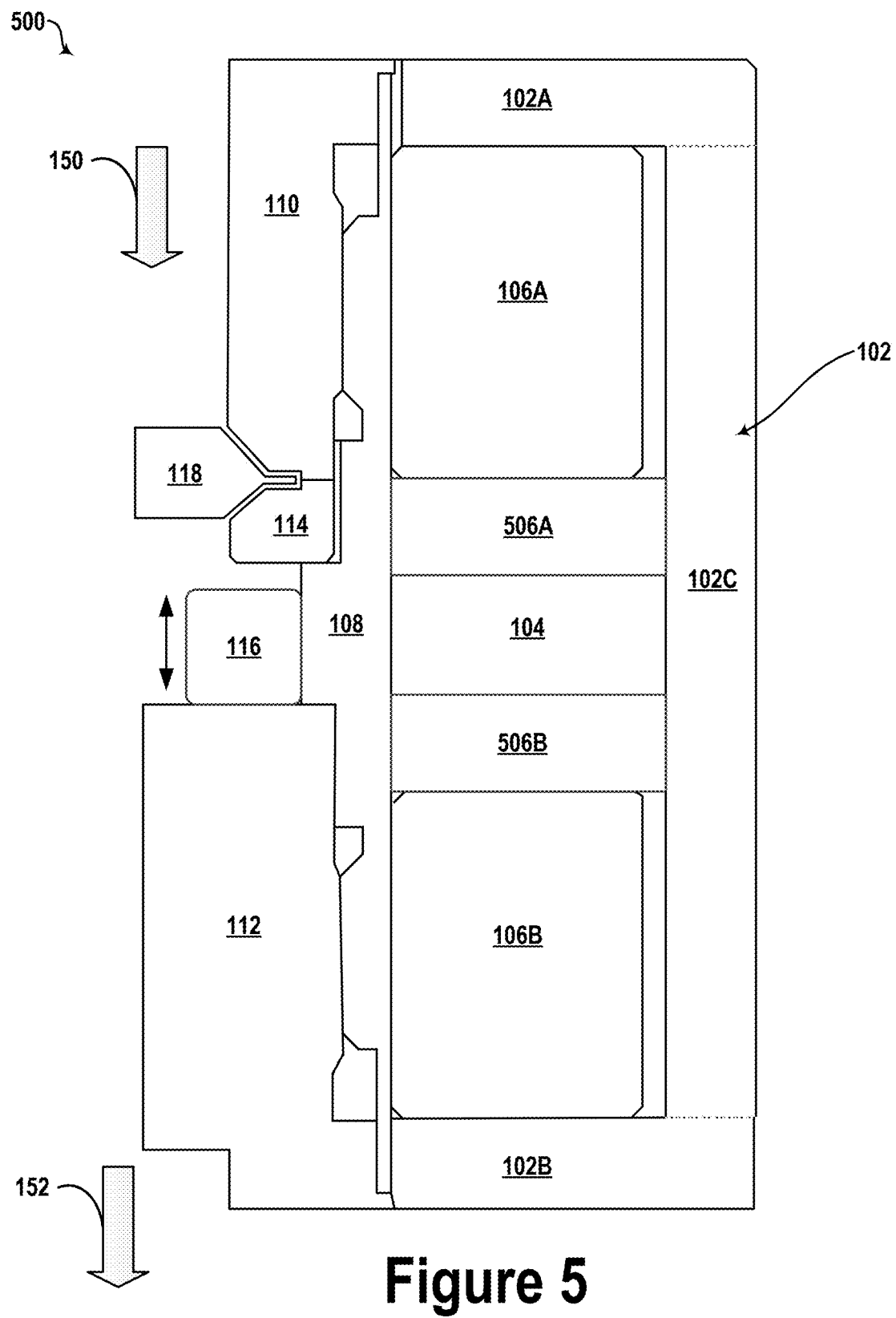
FIG. 5 illustrates a cross-sectional view of another propellant valve, according to an example.

Referring to FIG. 5, a cross-sectional view of another propellant valve 500 is illustrated, in accordance with an example. In some examples, as illustrated in FIG. 7, the propellant valve 500 can be integrated into a space vehicle, such as a satellite, e.g., satellite 700. However, it should be understood that the propellant valve 500 can be integrated into other space vehicles, such as manned or unmanned spacecraft. In particular, the propellant valve 500 can be used to perform positioning maneuvers while the satellite is in orbit. For example, the propellant valve 500 can be used as a mechanism of propulsion that enables the satellite to move once the satellite is in position above Earth.

The propellant valve 500 can include the components of the propellant valve 100 of FIG. 1 and can operate in a substantially similar manner as described with respect to FIGS. 3-4. To illustrate, the propellant valve 500 can include the ferromagnetic shell 102, the opening 104, the coils 106A, 106B, the bobbin 108, the upper ferromagnetic pole 110, the lower ferromagnetic pole 112, the ferromagnetic filter retainer 114, the magnet 116, and the fluid filter 118. Similar to the operation of the propellant valve 100, with respect to the propellant valve 500, the magnet 116 can be configured to move between a top portion of the lower ferromagnetic pole 112 and a bottom portion of the ferromagnetic filter retainer 114 based on a magnetic field generated by the pair of coils 106A, 106B. For example, when a first current is applied to the pair of coils 106A, 106B within the opening 104 of the ferromagnetic shell 102, a resulting magnetic field applies an upward force to the magnet 116 and moves the magnet 116 to the bottom portion of the ferromagnetic filter retainer 114. When a second current is applied to the pair of coils 106A, 106B within the opening 104 of the ferromagnetic shell 102, a resulting magnetic field applies a downward force to the magnet 116 and moves the magnet 116 to the top portion of the lower ferromagnetic pole 112.

However, the propellant valve 500 of FIG. 5 includes one or more magnetic shunts 506 placed between the two coils 106 in the vicinity of the magnet 116. For example, a magnetic shunt 506A is coupled to the coil 106A, and a magnetic shunt 506B is coupled to the coil 106B. The presence of the magnetic shunts 506A, 506B in the locations shown in FIG. 5 have the effect of reducing the number of ampere-turns required by the coils 106A, 106B to produce an amount of force on the magnet 116 to move the magnet 116. As a non-limiting example, less than twenty-one-hundred (2100) AT can be applied to the coils 106A, 106B move the magnet 116.

Figure 6:
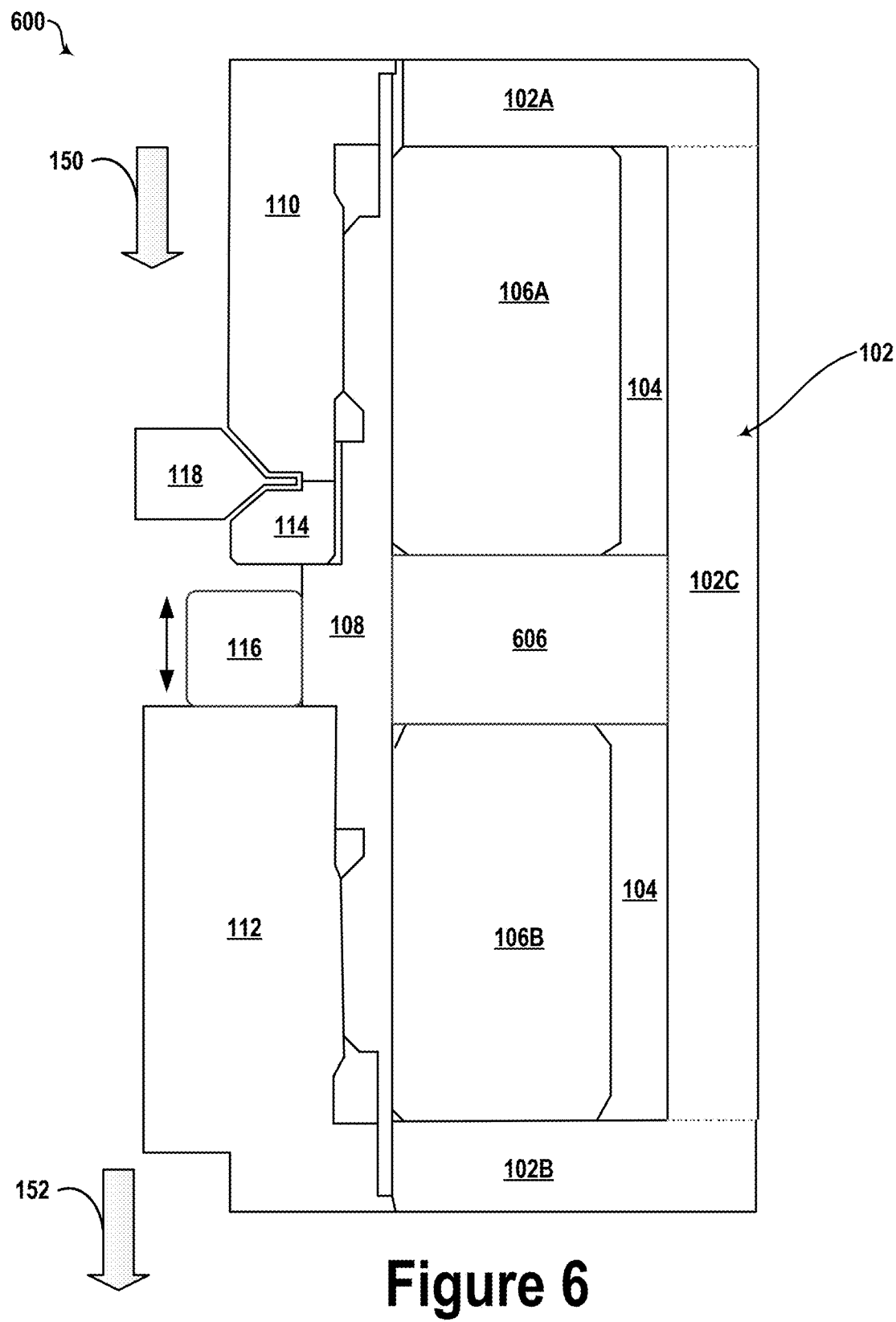
FIG. 6 illustrates a cross-sectional view of another propellant valve, according to an example.

Referring to FIG. 6, a cross-sectional view of another propellant valve 600 is illustrated, in accordance with an exemplary example. In some examples, as illustrated in FIG. 7, the propellant valve 600 can be integrated into a satellite, such as the satellite 700. In particular, the propellant valve 600 can be used to perform positioning maneuvers while the satellite is in orbit. For example, the propellant valve 600 can be used as a mechanism of propulsion that enables the satellite to move once the satellite is in position above Earth.

The propellant valve 600 can include the components of the propellant valve 100 of FIG. 1 and can operate in a substantially similar manner as described with respect to FIGS. 3-4. To illustrate, the propellant valve 600 can include the ferromagnetic shell 102, the opening 104, the coils 106A, 106B, the bobbin 108, the upper ferromagnetic pole 110, the lower ferromagnetic pole 112, the ferromagnetic filter retainer 114, the magnet 116, and the fluid filter 118. Similar to the operation of the propellant valve 100, with respect to the propellant valve 600, the magnet 116 can be configured to move between a top portion of the lower ferromagnetic pole 112 and a bottom portion of the ferromagnetic filter retainer 114 based on a magnetic field generated by the pair of coils 106A, 106B. For example, when a first current is applied to the pair of coils 106A, 106B within the opening 104 of the ferromagnetic shell 102, a resulting magnetic field applies an upward force to the magnet 116 and moves the magnet 116 to the bottom portion of the ferromagnetic filter 114. When a second current is applied to the pair of coils 106A, 106B within the opening 104 of the ferromagnetic shell 102, a resulting magnetic field applies a downward force to the magnet 116 and moves the magnet 116 to the top portion of the lower ferromagnetic pole 112.

However, the propellant valve 600 of FIG. 6 includes a single magnetic shunt 606 placed between the two coils 106 in the vicinity of the magnet 116. For simplicity of assembly and reduction in cost, the single magnetic shunt 606 can be used instead of a plurality of magnetic shunts, as illustrated in FIG. 5. The presence of the magnetic shunt 606 in the location shown in FIG. 6 also has the effect of reducing the number of ampere-turns required by the coils 106A, 106B to produce an amount of force on the magnet 116 to move the magnet 116.

Referring to FIG. 7, a satellite 700 that includes a propellant valve is illustrated, in accordance with an exemplary example. The satellite 700 includes a satellite propulsion system 702 that is configured to perform positioning maneuvers while the satellite 700 is in orbit. The satellite propulsion system 702 includes a fluid reservoir 708, a propellant valve 710 coupled to the fluid reservoir 708, and a nozzle 712 coupled to the propellant valve 710. According to some implementations, the propellant valve 710 can correspond to the propellant valve 100, the propellant valve 500, or the propellant valve 600. During operation, when the propellant valve 710 is open, fluid (e.g., xenon gas) from the fluid reservoir 708 flows through the propellant valve 710 and is released by the nozzle 712 to perform positioning maneuvers.

Figure 8:
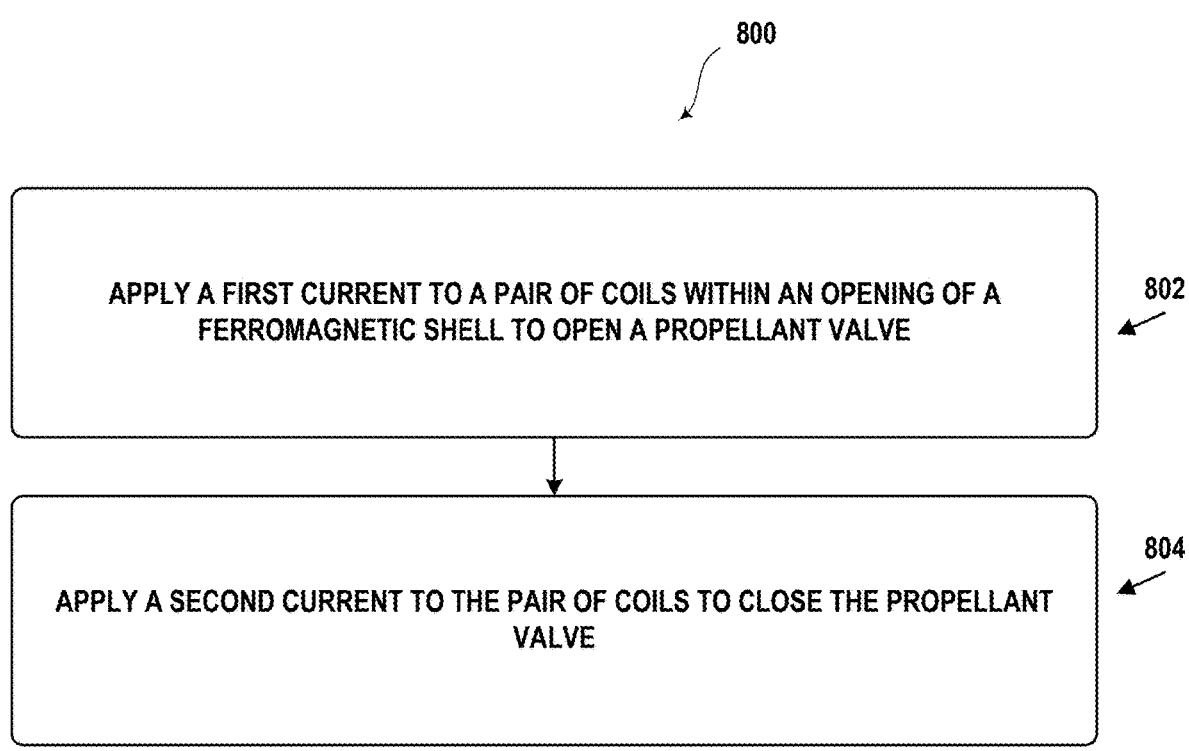
FIG. 8 is a flowchart of an example of an implementation of a method, according to an example.

FIG. 8 illustrates a flow chart of a method 800, according to an exemplary example.

The method 800 includes applying a first current to a pair of coils within an opening of a ferromagnetic shell to open a propellant valve, at block 802. For example, referring to FIG. 1, a first current is applied to the pair of coils 106A, 106B within the opening 104 of the ferromagnetic shell 102 to open the propellant valve 100. The ferromagnetic shell 102 includes the side section 102C, the upper section 102A that is perpendicular and continuous to the side section 102C, and the lower section 102B that is perpendicular and continuous to the side section 102C. The side section 102C, the upper section 102A, and the lower section 102B define the opening 104 of the ferromagnetic shell 102. The propellant valve 100 also includes the bobbin 108 that extends from the upper section 102A of the ferromagnetic shell 102 to the lower section 102B of the ferromagnetic shell 102. The bobbin 108 seals the opening 104 of the ferromagnetic shell 102. The propellant valve 100 also includes the upper ferromagnetic pole 110 coupled to the bobbin 108 and to the upper section 102A of the ferromagnetic shell 102. The propellant valve 100 also includes the lower ferromagnetic pole 112 coupled to the lower portion of the bobbin 108 and to the lower section 102B of the ferromagnetic shell 102. The propellant valve 100 also includes the ferromagnetic filter retainer 114 coupled to the upper ferromagnetic pole 110. The propellant valve 100 also include the magnet 116 configured to move between the top portion of the lower ferromagnetic pole 112 and the bottom portion of the ferromagnetic filter retainer 114 based on a magnetic field generated by the pair of coils 106A, 106B.

The method 800 also includes applying a second current to the pair of coils to close the propellant valve, at block 804. For example, referring to FIG. 1, a second current is applied to the pair of coils 106A, 106B to close the propellant valve 100.

According to one implementation of the method 800, the propellant valve 100 is closed when the magnet 116 is latched against the top portion of the lower ferromagnetic pole 112. The propellant valve 100 is open when the magnet 116 is latched against the bottom portion of the ferromagnetic filter retainer 114.

According to one implementation of the method 800, the magnet 116 is an annular cylindrical disk. According to one implementation, the magnet 116 is comprised of Iron-Boron-Neodymium (FeBNd).

According to one implementation of the method 800, the propellant valve 100 includes the cylindrical insert 210 within the hole 204. The hole 204 is centrally located on the bottom surface 202 of the magnet 116. The central region 212 of the cylindrical insert 210 is configured to cover the fluid exit region 152 of the propellant valve 100 when the propellant valve 100 is closed. The cylindrical insert 210 includes one or more insert holes 214 around the central region 212 of the cylindrical insert 210.

Further, the disclosure comprises the following examples:
Example 1. A propellant valve comprising: a ferromagnetic shell comprising: a side section; an upper section that is perpendicular and continuous to the side section; and a lower section that is perpendicular and continuous to the side section, wherein the side section, the upper section, and the lower section define an opening of the ferromagnetic shell; a pair of coils within the opening of the ferromagnetic shell; a bobbin extending from the upper section of the ferromagnetic shell to the lower section of the ferromagnetic shell, wherein the bobbin seals the opening of the ferromagnetic shell; an upper ferromagnetic pole coupled an upper portion of the bobbin and to the upper section of the ferromagnetic shell; a lower ferromagnetic pole coupled to a lower portion of the bobbin and to the lower section of the ferromagnetic shell; a ferromagnetic filter retainer coupled to the upper ferromagnetic pole; and a magnet configured to move between a top portion of the lower ferromagnetic pole and a bottom portion of the ferromagnetic filter retainer based on a magnetic field generated by the pair of coils.

Example 2. The propellant valve of example 1, wherein the propellant valve is closed when the magnet is latched against the top portion of the lower ferromagnetic pole, and wherein the propellant valve is open when the magnet is latched against the bottom portion of the ferromagnetic filter retainer.

Example 3. The propellant valve of example 1 or 2, wherein the magnet is an annular cylindrical disk.

Example 4. The propellant valve of any of examples 1-3, wherein the magnet is comprised of Iron-Boron-Neodymium (FeBNd).

Example 5. The propellant valve of any of examples 1-4, further comprising: a cylindrical insert within a hole, wherein the hole is centrally located on a bottom surface of the magnet, and wherein a central region of the cylindrical insert is configured to cover a fluid exit region of the propellant valve when the propellant valve is closed.

Example 6. The propellant valve of example 5, wherein the cylindrical insert comprises one or more insert holes around the central region of the cylindrical insert.

Example 7. The propellant valve of any of examples 1-6, wherein the bobbin is comprised of stainless steel.

Example 8. The propellant valve of any of examples 1-7, wherein the pair of coils comprises: an upper coil coupled to the upper section of the ferromagnetic shell; and a lower coil coupled to the lower section of the ferromagnetic shell.

Example 9. The propellant valve of example 8, wherein the upper coil and the lower coil are comprised of copper wire or aluminum wire.

Example 10. The propellant valve of any of examples 1-9, further comprising a fluid filter coupled to the upper ferromagnetic pole and to the ferromagnetic filter retainer, wherein the fluid filter is configured to filter fluid from a fluid entrance region of the propellant valve.

Example 11. A space vehicle comprising: a propellant valve configured to control a release of fluid from the fluid reservoir, the propellant valve comprising: a ferromagnetic shell comprising: a side section; an upper section that is perpendicular and continuous to the side section; and a lower section that is perpendicular and continuous to the side section, wherein the side section, the upper section, and the lower section define an opening of the ferromagnetic shell; a pair of coils within the opening of the ferromagnetic shell; a bobbin extending from the upper section of the ferromagnetic shell to the lower section of the ferromagnetic shell, wherein the bobbin seals the opening of the ferromagnetic shell; an upper ferromagnetic pole coupled an upper portion of the bobbin and to the upper section of the ferromagnetic shell; a lower ferromagnetic pole coupled to a lower portion of the bobbin and to the lower section of the ferromagnetic shell; a ferromagnetic filter retainer coupled to the upper ferromagnetic pole; and a magnet configured to move between a top portion of the lower ferromagnetic pole and a bottom portion of the ferromagnetic filter retainer based on a magnetic field generated by the pair of coils.

Example 12. The space vehicle of example 11, wherein the propellant valve is closed when the magnet is latched against the top portion of the lower ferromagnetic pole, and wherein the propellant valve is open when the magnet is latched against the bottom portion of the ferromagnetic filter retainer.

Example 13. The space vehicle of example 11 or 12, wherein the magnet is an annular cylindrical disk.

Example 14. The space vehicle of any of examples 11-13, wherein the magnet is comprised of Iron-Boron-Neodymium (FeBNd).

Example 15. The space vehicle of any of examples 11-14, further comprising: a cylindrical insert within a hole, wherein the hole is centrally located on a bottom surface of the magnet, and wherein a central region of the cylindrical insert is configured to cover a fluid exit region of the propellant valve when the propellant valve is closed.

Example 16. The space vehicle of example 15, wherein the cylindrical insert comprises one or more insert holes around the central region of the cylindrical insert.

Example 17. The space vehicle of any of examples 11-16, wherein the fluid comprises xenon gas.

Example 18. A method comprising: applying a first current to a pair of coils within an opening of a ferromagnetic shell to open a propellant valve, wherein the propellant valve comprises: the ferromagnetic shell comprising: a side section; an upper section that is perpendicular and continuous to the side section; and a lower section that is perpendicular and continuous to the side section, wherein the side section, the upper section, and the lower section define an opening of the ferromagnetic shell; a bobbin extending from the upper section of the ferromagnetic shell to the lower section of the ferromagnetic shell, wherein the bobbin seals the opening of the ferromagnetic shell; an upper ferromagnetic pole coupled an upper portion of the bobbin and to the upper section of the ferromagnetic shell; a lower ferromagnetic pole coupled to a lower portion of the bobbin and to the lower section of the ferromagnetic shell; a ferromagnetic filter retainer coupled to the upper ferromagnetic pole; and a magnet configured to move between a top portion of the lower ferromagnetic pole and a bottom portion of the ferromagnetic filter retainer based on a magnetic field generated by the pair of coils; and applying a second current to the pair of coils to close the propellant valve.

Example 19. The method of example 18, wherein the propellant valve is closed when the magnet is latched against the top portion of the lower ferromagnetic pole, and wherein the propellant valve is open when the magnet is latched against the bottom portion of the ferromagnetic filter retainer.

Example 20. The method of example 18 or 19, wherein the pair of coils comprises: an upper coil coupled to the upper section of the ferromagnetic shell; and a lower coil coupled to the lower section of the ferromagnetic shell.

Although the systems are described herein with specific reference to aircraft systems or aerospace vehicles, in other examples, the system can be a vehicle other than an aircraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all examples falling within the scope of the appended claims.

The invention claimed is:

1. A propellant valve comprising:
 a ferromagnetic shell comprising:
  a side section;
  an upper section that is perpendicular and continuous to the side section; and
  a lower section that is perpendicular and continuous to the side section, wherein the side section, the upper section, and the lower section define an opening of the ferromagnetic shell;
 a pair of coils within the opening of the ferromagnetic shell;
 a bobbin extending from the upper section of the ferromagnetic shell to the lower section of the ferromagnetic shell, wherein the bobbin seals the opening of the ferromagnetic shell;
 an upper ferromagnetic pole coupled an upper portion of the bobbin and to the upper section of the ferromagnetic shell;
 a lower ferromagnetic pole coupled to a lower portion of the bobbin and to the lower section of the ferromagnetic shell;
 a ferromagnetic filter retainer coupled to the upper ferromagnetic pole; and
 a magnet configured to move between a top portion of the lower ferromagnetic pole and a bottom portion of the ferromagnetic filter retainer based on a magnetic field generated by the pair of coils.

2. The propellant valve of claim 1, wherein the propellant valve is closed when the magnet is latched against the top portion of the lower ferromagnetic pole, and wherein the propellant valve is open when the magnet is latched against the bottom portion of the ferromagnetic filter retainer.

3. The propellant valve of claim 1, wherein the magnet is an annular cylindrical disk.

4. The propellant valve of claim 1, wherein the magnet is comprised of Iron-Boron-Neodymium (FeBNd).

5. The propellant valve of claim 1, further comprising:
 a cylindrical insert within a hole, wherein the hole is centrally located on a bottom surface of the magnet, and wherein a central region of the cylindrical insert is configured to cover a fluid exit region of the propellant valve when the propellant valve is closed.

6. The propellant valve of claim 5, wherein the cylindrical insert comprises one or more insert holes around the central region of the cylindrical insert.

7. The propellant valve of claim 1, wherein the bobbin is comprised of stainless steel.

8. The propellant valve of claim 1, wherein the pair of coils comprises:
 an upper coil coupled to the upper section of the ferromagnetic shell; and
 a lower coil coupled to the lower section of the ferromagnetic shell.

9. The propellant valve of claim 8, wherein the upper coil and the lower coil are comprised of copper wire or aluminum wire.

10. The propellant valve of claim 1, further comprising a fluid filter coupled to the upper ferromagnetic pole and to the ferromagnetic filter retainer, wherein the fluid filter is configured to filter fluid from a fluid entrance region of the propellant valve.

11. A space vehicle comprising:
 a fluid reservoir; and
 a propellant valve configured to control a release of fluid from the fluid reservoir, the propellant valve comprising:

a ferromagnetic shell comprising:
  a side section;
  an upper section that is perpendicular and continuous to the side section; and
  a lower section that is perpendicular and continuous to the side section, wherein the side section, the upper section, and the lower section define an opening of the ferromagnetic shell;
a pair of coils within the opening of the ferromagnetic shell;
a bobbin extending from the upper section of the ferromagnetic shell to the lower section of the ferromagnetic shell, wherein the bobbin seals the opening of the ferromagnetic shell;
an upper ferromagnetic pole coupled an upper portion of the bobbin and to the upper section of the ferromagnetic shell;
a lower ferromagnetic pole coupled to a lower portion of the bobbin and to the lower section of the ferromagnetic shell;
a ferromagnetic filter retainer coupled to the upper ferromagnetic pole; and
a magnet configured to move between a top portion of the lower ferromagnetic pole and a bottom portion of the ferromagnetic filter retainer based on a magnetic field generated by the pair of coils.

12. The space vehicle of claim 11, wherein the propellant valve is closed when the magnet is latched against the top portion of the lower ferromagnetic pole, and wherein the propellant valve is open when the magnet is latched against the bottom portion of the ferromagnetic filter retainer.

13. The space vehicle of claim 11, wherein the magnet is an annular cylindrical disk.

14. The space vehicle of claim 11, wherein the magnet is comprised of Iron-Boron-Neodymium (FeBNd).

15. The space vehicle of claim 11, further comprising:
a cylindrical insert within a hole, wherein the hole is centrally located on a bottom surface of the magnet, and wherein a central region of the cylindrical insert is configured to cover a fluid exit region of the propellant valve when the propellant valve is closed.

16. The space vehicle of claim 15, wherein the cylindrical insert comprises one or more insert holes around the central region of the cylindrical insert.

17. The space vehicle of claim 11, wherein the fluid comprises xenon gas.

18. A method comprising:
applying a first current to a pair of coils within an opening of a ferromagnetic shell to open a propellant valve, wherein the propellant valve comprises:
  the ferromagnetic shell comprising:
    a side section;
    an upper section that is perpendicular and continuous to the side section; and
    a lower section that is perpendicular and continuous to the side section, wherein the side section, the upper section, and the lower section define an opening of the ferromagnetic shell;
  a bobbin extending from the upper section of the ferromagnetic shell to the lower section of the ferromagnetic shell, wherein the bobbin seals the opening of the ferromagnetic shell;
  an upper ferromagnetic pole coupled an upper portion of the bobbin and to the upper section of the ferromagnetic shell;
  a lower ferromagnetic pole coupled to a lower portion of the bobbin and to the lower section of the ferromagnetic shell;
  a ferromagnetic filter retainer coupled to the upper ferromagnetic pole; and
  a magnet configured to move between a top portion of the lower ferromagnetic pole and a bottom portion of the ferromagnetic filter retainer based on a magnetic field generated by the pair of coils; and
applying a second current to the pair of coils to close the propellant valve.

19. The method of claim 18, wherein the propellant valve is closed when the magnet is latched against the top portion of the lower ferromagnetic pole, and wherein the propellant valve is open when the magnet is latched against the bottom portion of the ferromagnetic filter retainer.

20. The method of claim 18, wherein the pair of coils comprises:
an upper coil coupled to the upper section of the ferromagnetic shell; and
a lower coil coupled to the lower section of the ferromagnetic shell.

\* \* \* \* \*